US007920128B2

(12) United States Patent
Park et al.

(10) Patent No.: US 7,920,128 B2
(45) Date of Patent: Apr. 5, 2011

(54) TOUCH SENSITIVE DISPLAY DEVICE AND DRIVING APPARATUS THEREOF, AND METHOD OF DETECTING A TOUCH

(75) Inventors: Jong-Woung Park, Seongnam-si (KR); Young-Ok Cha, Gwangmyeong-si (KR); Man-Seung Cho, Seoul (KR); Kee-Han Uh, Yongin-si (KR); Joo-Hyung Lee, Gwacheon-si (KR)

(73) Assignee: Samsung Electronics., Ltd. (KR)

( * ) Notice: Subject to any disclaimer, the term of this patent is extended or adjusted under 35 U.S.C. 154(b) by 1109 days.

(21) Appl. No.: 11/524,827

(22) Filed: Sep. 20, 2006

(65) Prior Publication Data
US 2007/0063990 A1 Mar. 22, 2007

(30) Foreign Application Priority Data
Sep. 21, 2005 (KR) .................. 10-2005-0087795

(51) Int. Cl.
*G06F 3/41* (2006.01)
(52) U.S. Cl. ...................................... 345/173; 345/178
(58) Field of Classification Search .................. 345/82, 345/104, 173–184, 204, 211, 902, 50, 87, 345/92, 156, 594; 710/316; 315/169.2, 149; 386/54, 55; 178/18.01, 18.02, 19.03; 341/31; 349/12, 24
See application file for complete search history.

(56) References Cited

U.S. PATENT DOCUMENTS

| | | | | |
|---|---|---|---|---|
| 4,521,870 A * | 6/1985 | Babbel et al. | .................. | 710/316 |
| 4,782,521 A * | 11/1988 | Bartlett et al. | ................. | 379/354 |
| 5,194,863 A * | 3/1993 | Barker et al. | ................... | 341/31 |
| 5,680,159 A * | 10/1997 | Lunetta | ........................ | 345/173 |
| 6,703,570 B1 * | 3/2004 | Russell et al. | ............. | 178/19.03 |
| 6,803,906 B1 * | 10/2004 | Morrison et al. | ............. | 345/173 |
| 7,166,966 B2 * | 1/2007 | Naugler et al. | ................ | 315/149 |
| 7,236,162 B2 * | 6/2007 | Morrison et al. | ............. | 345/173 |
| 7,522,149 B2 * | 4/2009 | Nakamura et al. | ............ | 345/104 |
| 2003/0179323 A1 * | 9/2003 | Abileah et al. | .................. | 349/24 |
| 2003/0214486 A1 | 11/2003 | Roberts | | |
| 2004/0012573 A1 * | 1/2004 | Morrison et al. | ............. | 345/173 |
| 2004/0113877 A1 * | 6/2004 | Abileah et al. | .................. | 345/92 |
| 2004/0227743 A1 * | 11/2004 | Brown | ......................... | 345/204 |
| 2005/0088424 A1 * | 4/2005 | Morrison et al. | ............. | 345/173 |

(Continued)

FOREIGN PATENT DOCUMENTS

CN 1527274 9/2004

(Continued)

OTHER PUBLICATIONS

Patent Abstracts of Japan, Publication No. 05-006153, Jan. 14, 1993, 1 p.

(Continued)

*Primary Examiner* — Prabodh M Dharia
(74) *Attorney, Agent, or Firm* — Innovation Counsel LLP

(57) ABSTRACT

According to an embodiment of the present invention, a display device may include a display panel, a plurality of pixels disposed on the display panel, a plurality of first sensing units disposed on the display panel and generating first sensing signals in response to a touch exerted on the display panel, and a sensing signal processor configured to process the first sensing signals and generate second sensing signals for a plurality of frames, the sensing signal processor determining whether a touch occurs based on the second sensing signals for the plurality of frames.

22 Claims, 10 Drawing Sheets

U.S. PATENT DOCUMENTS

| | | | |
|---|---|---|---|
| 2006/0114247 A1* | 6/2006 | Brown | 345/204 |
| 2007/0063990 A1* | 3/2007 | Park et al. | 345/173 |
| 2007/0063991 A1* | 3/2007 | Lee et al. | 345/173 |
| 2007/0091013 A1* | 4/2007 | Pak et al. | 345/50 |

FOREIGN PATENT DOCUMENTS

| | | |
|---|---|---|
| JP | 5-6153 | 1/1993 |
| JP | 8-30377 | 2/1996 |
| JP | 8-501164 | 2/1996 |
| JP | 10-161810 | 6/1998 |
| JP | 200184100 | 3/2001 |
| JP | 2004-117646 | 4/2004 |
| JP | 2004-534974 | 11/2004 |
| KR | 1998-041328 | 8/1998 |
| KR | 1999-0087804 | 12/1999 |
| KR | 2001-0061329 | 7/2001 |
| KR | 2004-0095941 | 11/2004 |
| KR | 2004-0106561 | 12/2004 |
| KR | 2005-0047587 | 5/2005 |
| WO | WO 02/354460 | 5/2002 |

OTHER PUBLICATIONS

Patent Abstracts of Japan, Publication No. 08-030377, Feb. 2, 1996, 1 p.
Abstract, US5334805, 1 p.
Patent Abstracts of Japan, Publication No. 10-161810, Jun. 19, 1998, 1 p.
Patent Abstracts of Japan, Publication No. 2001-084100, Mar. 30, 2001, 1 p.
Patent Abstracts of Japan, Publication No. 2004-117646, Apr. 15, 2004, 1 p.
Abstract, International Publication No. WO0235460, May 2, 2002, 2 pp.
Korean Patent Abstracts, Publication No. 1019980041328, Aug. 17, 1998, 1 p.
Korean Patent Abstracts, Publication No. 1019990087804, Dec. 27, 1999, 1 p.
Korean Patent Abstracts, Publication No. 1020010061329, Jul. 7, 2001, 1 p.
Korean Patent Abstracts, Publication No. 1020040095941, Nov. 16, 2004, 1 p.
Korean Patent Abstracts, Publication No. 102005-0106561, Dec. 17, 2004, 1 p.
Korean Patent Abstracts, Publication No. 1020050047587, May 23, 2005, 1 p.

* cited by examiner

TOUCH SENSITIVE DISPLAY DEVICE AND DRIVING APPARATUS THEREOF, AND METHOD OF DETECTING A TOUCH

CROSS-REFERENCE TO RELATED APPLICATION

This application claims priority to and the benefit of Patent Application No. 10-2005-0087795 filed in the Korean Intellectual Property Office, Republic of Korea, on Sep. 21, 2005, the entire content of which is incorporated by reference.

BACKGROUND OF THE INVENTION (a) Field of the Invention

The present invention relates to a touch sensitive display device, a driving apparatus thereof, and a method of detecting a touch.

(b) Description of Related Art

A liquid crystal display (LCD) includes a pair of panels provided with pixel electrodes and a common electrode, and a liquid crystal layer with dielectric anisotropy interposed between the panels. The pixel electrodes are arranged in a matrix and connected to switching elements such as thin film transistors (TFTs) such that they receive image data voltages row by row. The common electrode covers the entire surface of one of the two panels and it is supplied with a common voltage. A pixel electrode and corresponding portions of the common electrode, and corresponding portions of the liquid crystal layer, form a liquid crystal capacitor that as along with a switching element connected thereto is a basic element of a pixel. An LCD generates electric fields by applying voltages to pixel electrodes and a common electrode and varies the strength of the electric fields to adjust the transmittance of light passing through a liquid crystal layer, thereby displaying images.

A touch screen panel is an apparatus on which a finger or a stylus is touched to write characters, to draw pictures, or to instruct a device such as a computer to execute instructions by using icons. The touch screen panel has its own mechanism to determine whether and where a touch occurs, and it is usually attached on a display device such as an LCD. However, an LCD provided with a touch screen panel has a high manufacturing cost due to the cost of the touch screen panel, low productivity due to a step for attaching the touch screen panel to the LCD, reduction of luminance of the LCD, increase of the thickness of the LCD, etc. Sensors have been developed that include TFTs, and they are incorporated into pixels in an LCD instead of a touch screen panel. A sensor senses a variation of light incident on a panel or pressure put on a panel caused by a user's finger, etc., to inform the LCD whether the user's finger, etc., touches the screen and where the touch is exerted. However, as the sensors are incorporated into the LCD, signals of the sensor may be affected by driving signals of the LCD. Also, the signals of the sensors may be non-uniform due to degradation of the sensors themselves as well as sensing conditions.

The above information disclosed in this Background section is only for enhancement of understanding of the background of the invention and therefore it may contain information that does not form the prior art that is already known in this country to a person of ordinary skill in the art.

SUMMARY OF THE INVENTION

A display device according to an embodiment of the present invention may include a display panel, a plurality of pixels disposed on the display panel, a plurality of first sensing units disposed on the display panel and generating first sensing signals in response to a touch exerted on the display panel, and a sensing signal processor configured to process the first sensing signals and generate second sensing signals for a plurality of frames, the sensing signal processor determining whether a touch occurs based on the second sensing signals for the plurality of frames. The sensing signal processor may determine whether a touch occurs based on differences in the second sensing signals between the plurality of frames. The sensing signal processor may determine whether a touch occurs in a first frame based on differences in the second sensing signals between the first frame and at least one second frame previous to the first frame. The sensing signal processor may determine whether a touch occurs in a first frame based on differences in the second sensing signals between the first frame and a second frame previous to the first frame and between the second frame and one or more third frames that occur between the second frame and the first frame.

The sensing signal processor may also determine whether a touch begins in a first frame based on differences in the second sensing signals between the first frame and at least one second frame previous to the first frame, and may determine whether a touch ends in the first frame based on differences in the second sensing signals between the first frame and a third frame previous to the first frame and between the third frame and one or more fourth frames that occur between the third frame and the first frame. The sensing signal processor may calculate a first difference data for a current frame that is defined as a maximum of subtractions of the second sensing signals for a first predetermined number of previous frames from the second sensing signal for the current frame, and determine that a touch begins when the first difference data is equal to or greater than a first positive value.

The sensing signal processor may calculate a second difference data for the current frame that is defined as a maximum of subtractions of the second sensing signals for the current frame and for a second predetermined number of previous frames from the second sensing signal for another frame before the second predetermined number of previous frames, and determines that a touch ends when the second difference data is equal to or greater than a second positive value. The sensing signal processor may calculate a first difference data for a current frame that is defined as a minimum of subtractions of the second sensing signals for a first predetermined number of previous frames from the second sensing signal for the current frame, and determine that a touch begins when the first difference data is equal to or smaller than a first negative value. The sensing signal processor may calculate a second difference data for the current frame that is defined as a minimum of subtractions of the second sensing signals for the current frame and for a second predetermined number of previous frames from the second sensing signal for another frame before the second predetermined number of previous frames, and determine that the touch ends when the second difference data is equal to or smaller than a second negative value.

The display device may further include a frame memory configured for storing and providing the second sensing signals. The sensing signal processor may amplify the first sensing signals and digitize the amplified first sensing signals. The sensing signal processor may average the digitized first sensing signals over the plurality of frames to generate the second sensing signals. The first sensing units may include a plurality of rows of second sensing units and a plurality of columns of third sensing units, wherein the second sensing units in each row may be connected to each other, and the third sensing units in each column are connected to each other. The display device may further include a plurality of first sensor data lines connected to the second sensing units, the plurality of first sensor data lines extending in a row direction and being configured to transmit the first sensing signals from the second sensing units, and a plurality of second sensor data lines connected to the third sensing units, the plurality of second sensor data lines extending in a column direction and being configured to transmit the first sensing signals from the third sensing units.

The sensing signal processor may determine an occurrence of a touch based on each of the first sensing signals and determine a position of a touch depending on the determination of an occurrence of a touch. The plurality of first sensing units may be configured to sense pressure exerted on the display panel. The display device may further include a plurality of second sensing units configured to sense ambient light and to generate third sensing signals, wherein the sensing signal processor determines a position of a touch based on the third sensing signals. The sensing signal processor may be configured to convert the third sensing signals to fourth sensing signals and apply an edge detection algorithm to the fourth sensing signals to determine where a touch occurs.

An apparatus for driving a display panel, according to an embodiment of the present invention, the display panel including a plurality of sensing units configured to generate a plurality of first sensing signals in response to a touch exerted on the display panel, where the apparatus for driving a display panel includes a sensing signal processor configured to generate a plurality of second sensing signals for a plurality of frames based on the first sensing signals from the display panel and determining whether a touch occurs based on the second sensing signals for the plurality of frames, and a frame memory configured to store at least one of the first and second sensing signals. The sensing signal processor may be configured to determine that a touch begins in a current frame when a first difference data for the current frame is equal to or greater than a first positive value, and the first difference data for the current frame is defined as a maximum of subtractions of the second sensing signals for a first predetermined number of previous frames from the second sensing signal for the current frame. The sensing signal processor may be configured to determine that a touch ends in the current frame when a second difference data for the current frame is equal to or greater than a second positive value, and the second difference data for the current frame is defined as a maximum of subtractions of the second sensing signals for the current frame and for a second predetermined number of previous frames from the second sensing signal for another frame before the second predetermined number of previous frames. The sensing signal processor may be configured to amplify the first sensing signals to provide amplified first sensing signals, and digitize the amplified first sensing signals. The sensing signal processor may average the digitized first sensing signals over the plurality of frames to generate the second sensing signals.

A method of detecting a touch exerted on a display panel, according to an embodiment of the present invention, includes generating a plurality of pointwise sensor output signals in response to a touch exerted on the display panel, collecting the sensor output signals in rows and columns to generate a sensor data signal for each row and for each column corresponding to each frame of a plurality of frames, and determining whether a touch occurs based on the sensor data signals for a plurality of frames. The operation of determining whether a touch occurs may include calculating a first difference data for a current frame equal to a maximum of subtractions of the sensor data signals for a first predetermined number of frames previous to the current frame from the sensor data signal for the current frame, and comparing the first difference data with a first predetermined value, where it is determined that a touch begins when the first difference data is equal to or greater than the first predetermined value. The operation of determining whether a touch occurs may further include calculating a second difference data for a current frame equal to a maximum of subtractions of the sensor data signals for the current frame and for a second predetermined number of frames previous to the current frame from the second sensing signal for another frame previous to the second predetermined number of previous frames, and comparing the second difference data with a second predetermined value, where it is determined that a touch ends when the second difference data is equal to or greater than the second predetermined value. The method may further include amplifying the sensor data signals, digitizing the amplified sensor data signals, and averaging the digitized sensor data signals over a predetermined number of frames.

BRIEF DESCRIPTION OF THE DRAWINGS

The accompanying drawings briefly described below illustrate exemplary embodiments of the present invention, and together with the description, serve to explain the principles of the present invention.

DETAILED DESCRIPTION OF EMBODIMENTS

Figure 1:
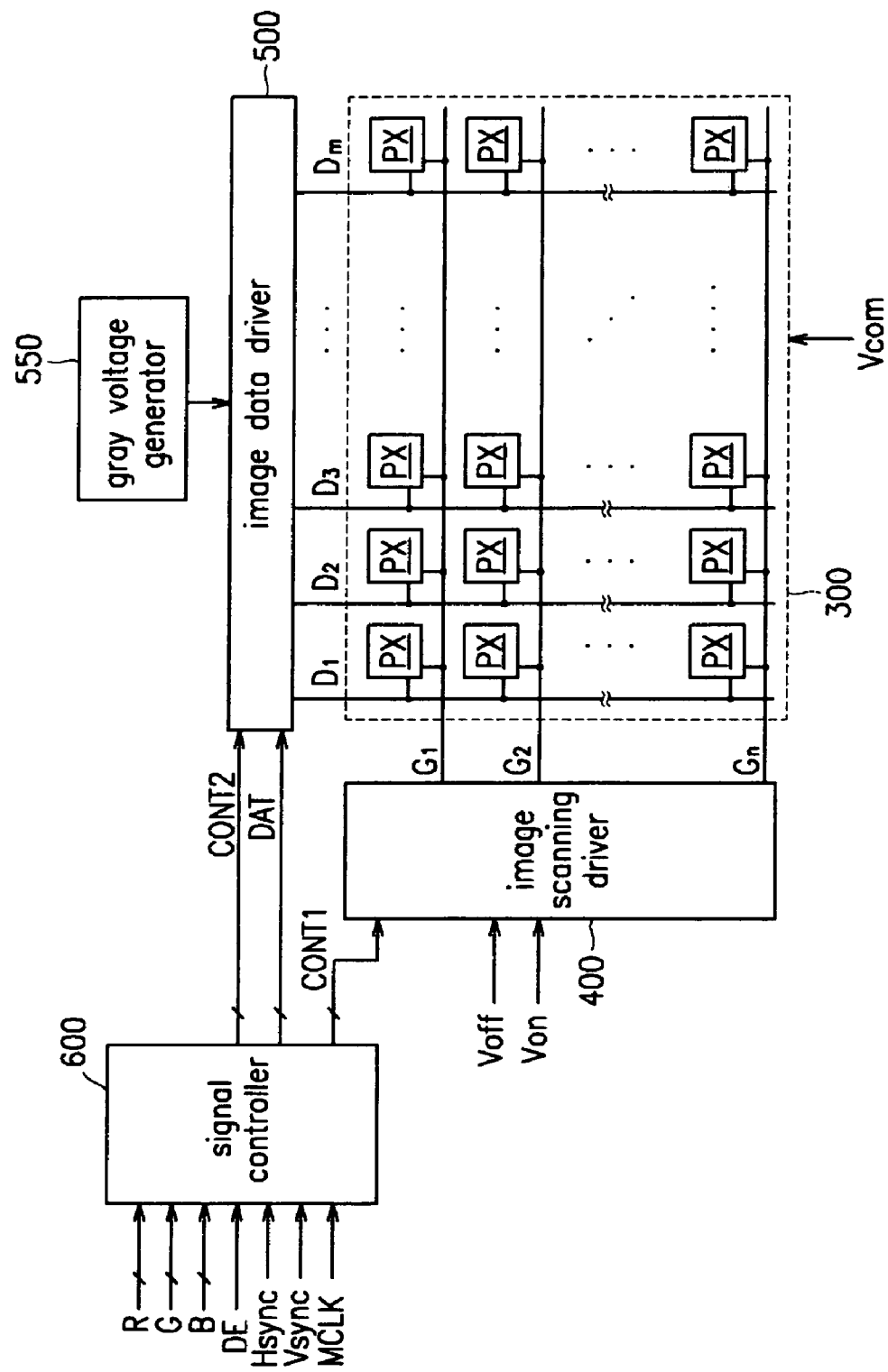
FIG. 1 is a block diagram of an LCD according to an embodiment of the present invention from the standpoint of a pixel of the LCD.

The present invention will be described more fully hereinafter with reference to the accompanying drawings, in which preferred embodiments of the invention are shown. In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
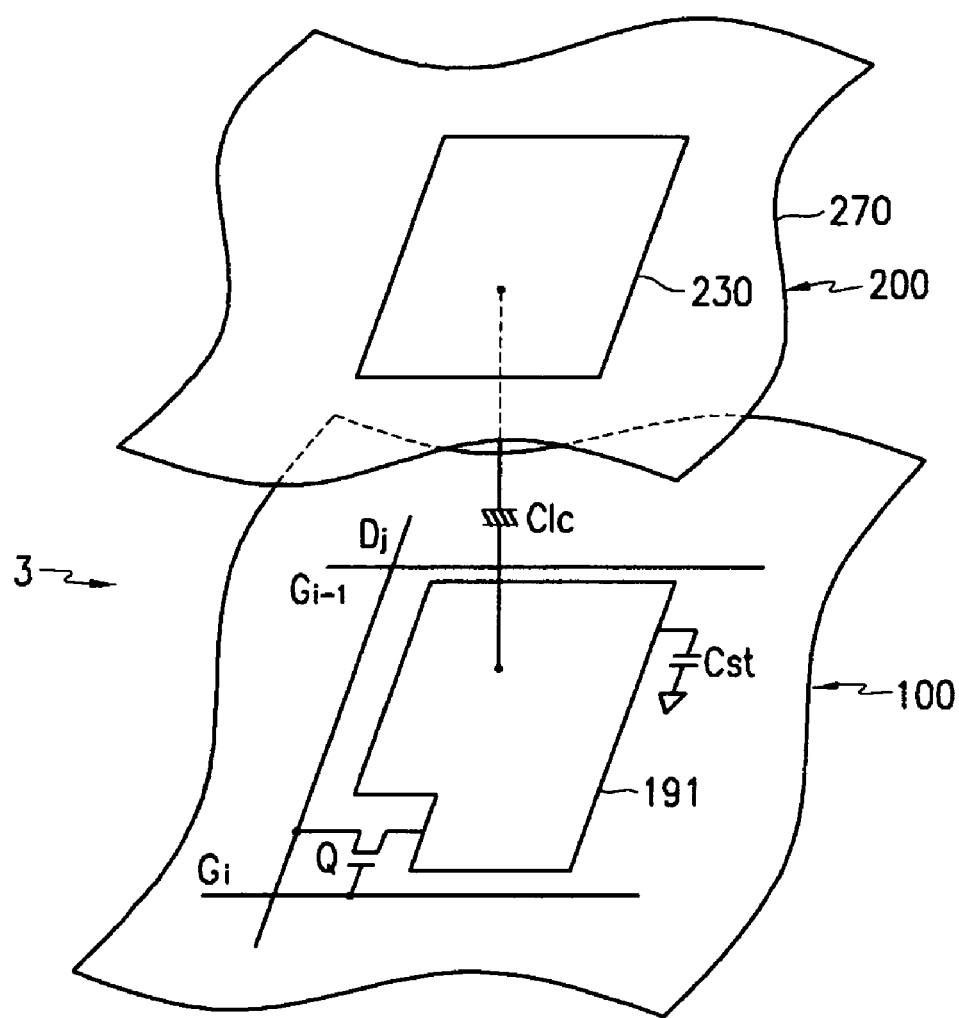
FIG. 2 is an equivalent circuit diagram of a pixel of an LCD according to an embodiment of the present invention.
Figure 3:
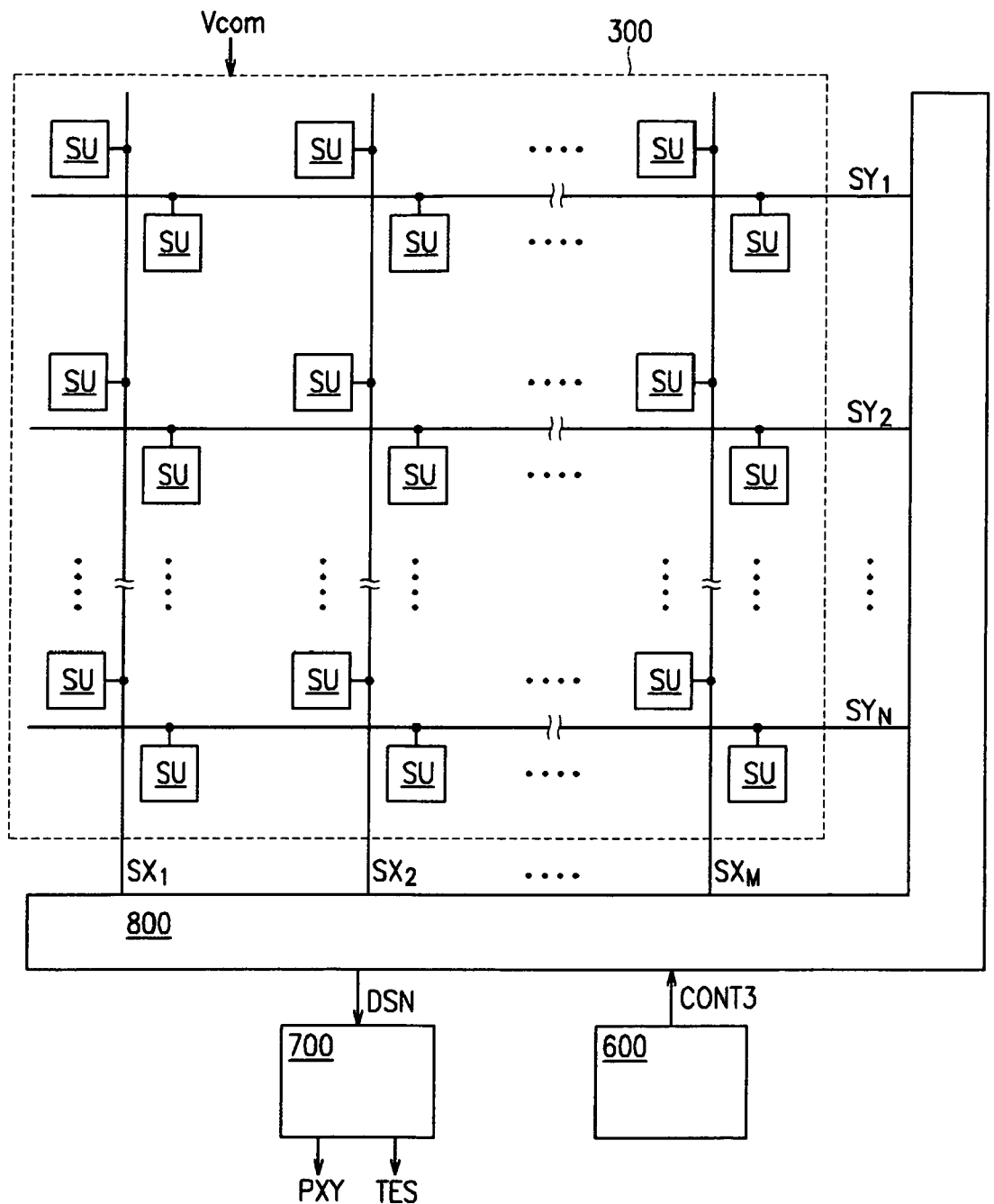
FIG. 3 is a block diagram of an LCD according to an embodiment of the present invention from the standpoint of a sensing unit of the LCD.
Figure 4A:
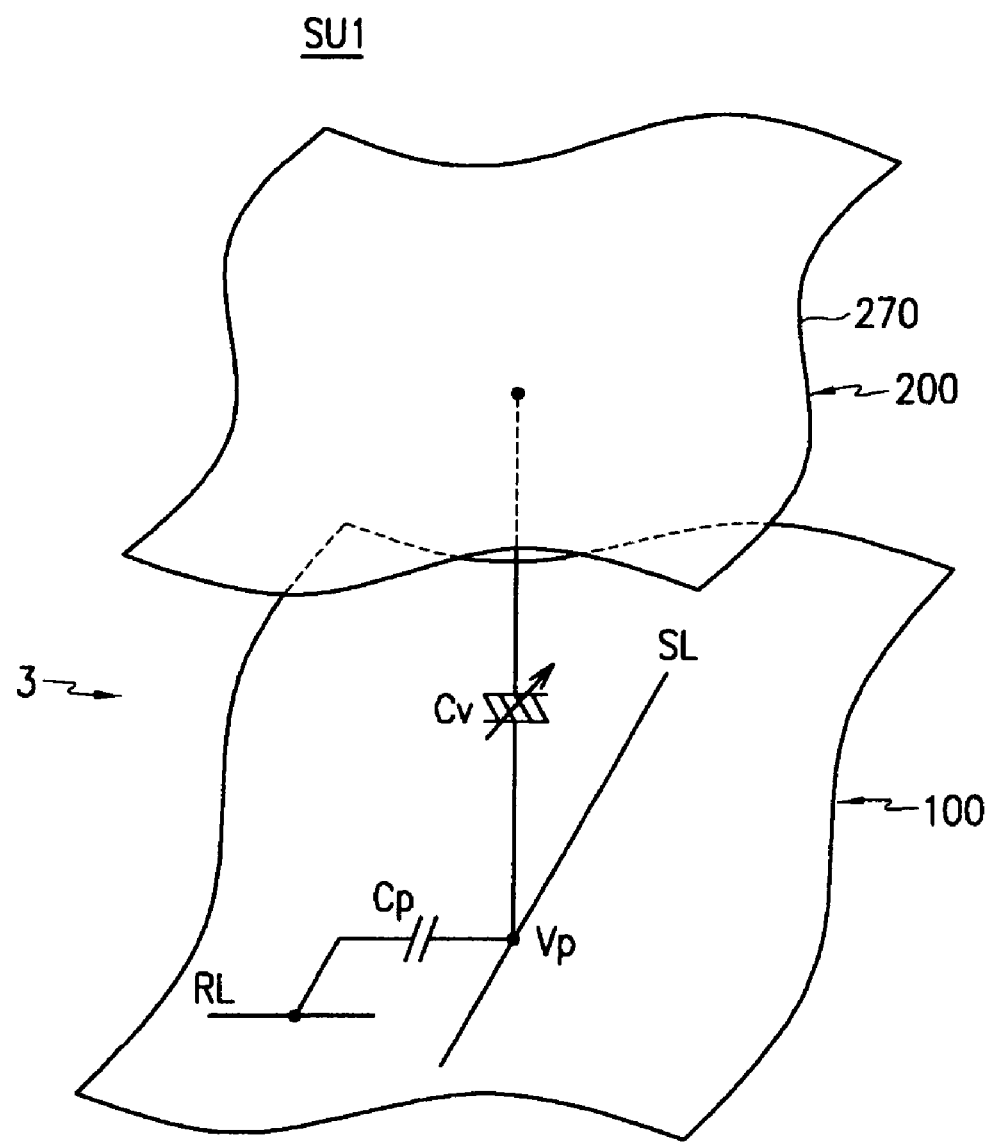
FIG. 4A and FIG. 4B are equivalent circuit diagrams of a sensing unit of an LCD according to an embodiment of the present invention.
Figure 4B:
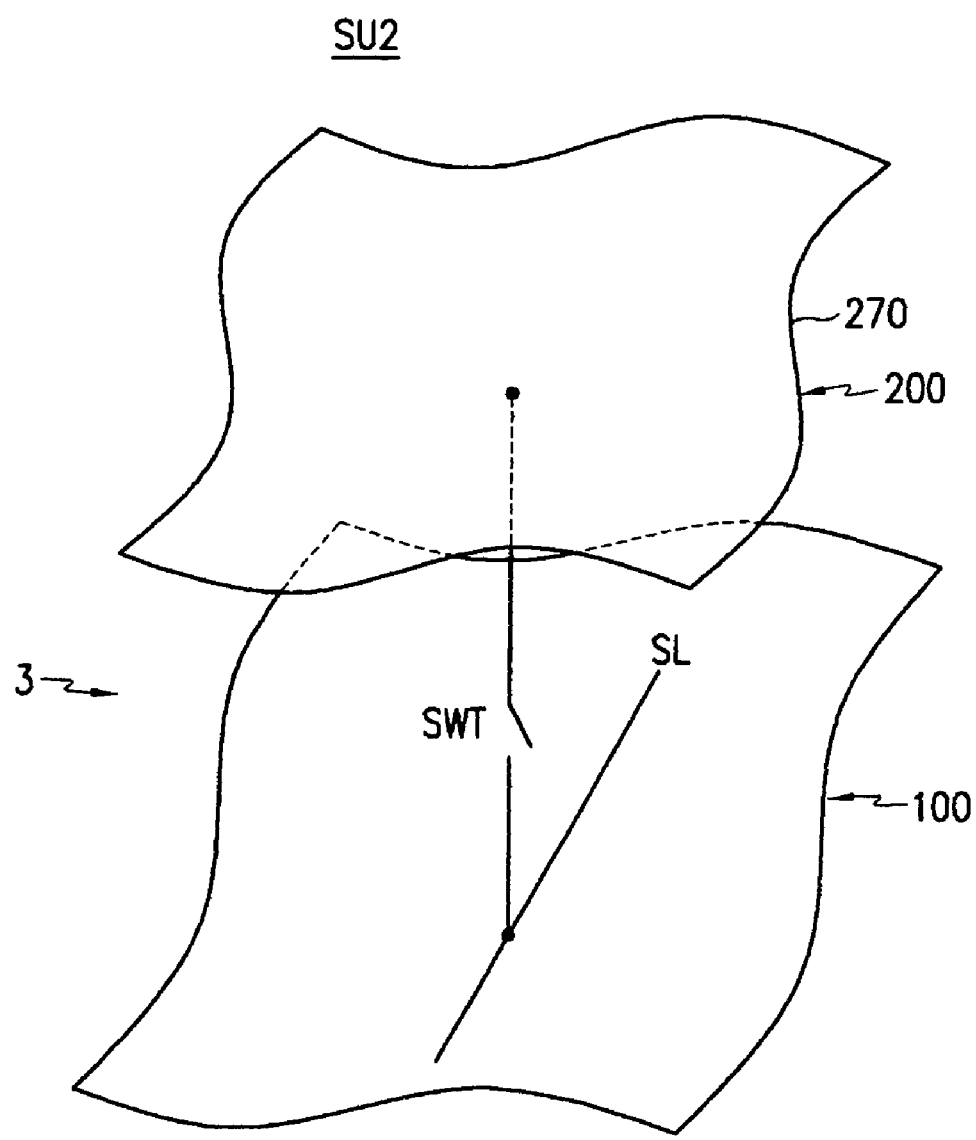
Figure 5A:
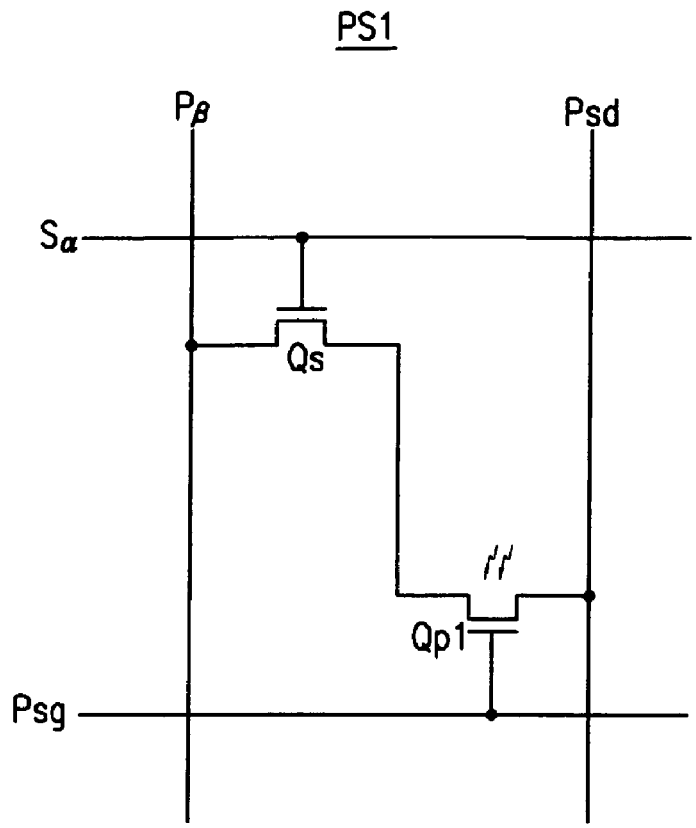
FIG. 5A and FIG. 5B are equivalent circuit diagrams of a photosensor of an LCD according to an embodiment of the present invention.
Figure 5B:
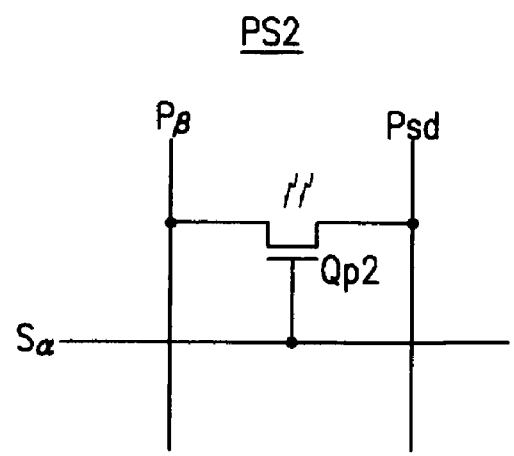

A liquid crystal display as an example of a display device according to an embodiment of the present invention will now be described in detail with reference to FIG. 1 to FIG. 5B. FIG. 1 is a block diagram of an LCD according to an embodiment of the present invention from the standpoint of a pixel of the LCD, and FIG. 2 is an equivalent circuit diagram of a pixel of an LCD according to an embodiment of the present invention. FIG. 3 is a block diagram of an LCD according to an embodiment of the present invention from the standpoint of a sensing unit of the LCD, and FIG. 4A and FIG. 4B are equivalent circuit diagrams of a sensing unit of an LCD according to an embodiment of the present invention. FIG. 5A and FIG. 5B are equivalent circuit diagrams of a photosensor of an LCD according to an embodiment of the present invention.

Referring to FIG. 1 and FIG. 3, an LCD according to an embodiment includes a liquid crystal (LC) panel assembly 300, an image scanning driver 400, an image data driver 500, a sensing signal processor 800, a gray voltage generator 550, a touch determination unit 700, and a signal controller 600. Referring to FIG. 1, the liquid crystal panel assembly 300 includes a plurality of display signal lines $G_1$-$G_n$ and $D_1$-$D_m$ and a plurality of pixels PX connected to the display signal lines $G_1$-$G_n$ and $D_1$-$D_m$ and arranged substantially in a matrix. Referring to FIG. 3, the panel assembly 300 further includes a plurality of sensor signal lines $SY_1$-$SY_N$ and $SX_1$-$SX_M$ and a plurality of sensing units SU connected to the sensor signal lines $SY_1$-$SY_N$ and $SX_1$-$SX_M$ and arranged substantially in a matrix.

Referring to FIG. 2, FIG. 4A, and FIG. 4B, the liquid crystal panel assembly 300, in a structural view, includes a thin film transistor (TFT) array panel 100, a common electrode panel 200 facing the TFT array panel 100, and a liquid crystal layer 3 interposed between the panels 100 and 200. The panel assembly 300 may further include at least one polarizer (not shown) provided thereon. The display signal lines include a plurality of image scanning lines $G_1$-$G_n$ for transmitting image scanning signals and a plurality of image data lines $D_1$-$D_m$ for transmitting image data signals. The sensor signal lines include a plurality of row sensor data lines $SY_1$-$SY_N$ and a plurality of column sensor data lines $SX_1$-$SX_M$, which transmit sensor data signals. Referring to FIG. 4, the sensor signal lines further include a plurality of reference voltage lines RL transmitting a reference voltage. The reference voltage lines RL may be omitted. The display signal lines $G_1$-$G_n$ and $D_1$-$D_m$ and the sensor signal lines $SY_1$-$SY_N$ and $SX_1$-$SX_M$ are disposed on the TFT array panel 100. The display signal lines $G_1$-$G_n$ and the row sensor signal lines $SY_1$-$SY_N$ extend substantially in a row direction and are substantially parallel to each other, while the display signal lines $D_1$-$D_m$ and the column sensor data lines $SX_1$-$SX_M$ extend substantially in a column direction and are substantially parallel to each other. The reference voltage lines RL may extend in a row direction or a column direction.

Referring to FIG. 2, each pixel PX, a pixel in the i-th row (i=1, 2, . . . , n) and the j-th column (j=1, 2, . . . , m) includes a switching element Q connected to the display signal lines $G_i$ and $D_j$, and a liquid crystal capacitor Clc and a storage capacitor Cst connected to the switching element Q. The storage capacitor Cst may be omitted. The switching element Q is disposed on the TFT array panel 100 and may be a TFT or other suitable device. The switching element Q has three terminals, i.e., a control terminal connected to the image scanning line $G_i$, an input terminal connected to the image data line $D_j$, and an output terminal connected to the LC capacitor Clc and the storage capacitor Cst. Here, the TFT includes amorphous silicon or polycrystalline silicon. The liquid crystal capacitor Clc includes a pixel electrode 191 disposed on the TFT array panel 100 and a common electrode 270 disposed on the common electrode panel 200 as two terminals. The LC layer 3 disposed between the two electrodes 190 and 270 functions as a dielectric of the LC capacitor Clc. The pixel electrode 191 is connected to the switching element Q, and the common electrode 270 is supplied with a common voltage Vcom and covers an entire surface of the common electrode panel 200. Unlike FIG. 2, the common electrode 270 may be provided on the TFT array panel 100, and at least one of the electrodes 191 and 270 may have a shape of a bar or stripe.

The storage capacitor Cst is an auxiliary capacitor for the LC capacitor Clc. The storage capacitor Cst includes the pixel electrode 191 and a separate signal line (not shown), which is provided on the TFT array panel 100, overlaps the pixel electrode 191 via an insulator, and is supplied with a predetermined voltage such as the common voltage Vcom. Alternatively, the storage capacitor Cst includes the pixel electrode 191 and an adjacent gate line $G_{i-1}$ called a previous gate line, which overlaps the pixel electrode 191 via an insulator. For color display, each pixel PX uniquely represents one of the primary colors (i.e., spatial division), or each pixel PX sequentially represents the primary colors in turn (i.e., temporal division), such that a spatial or temporal sum of the primary colors is recognized as a desired color. An example of a set of the primary colors includes red, green, and blue. FIG. 2 shows an example of the spatial division in which each pixel PX includes a color filter 230 representing one of the primary colors in an area of the common electrode panel 200 facing the pixel electrode 191. Alternatively, the color filter 230 is provided on or under the pixel electrode 191 on the TFT array panel 100. A set of three pixels PX that represent three primary colors and are disposed adjacent to one another are referred to as a dot, which is a basic unit of an image. The numbers of rows and columns of the dots represent the resolution of the LCD. According to another embodiment, a dot may include four or more pixels PX, and in this case, some of the pixels PX may represent the color white.

Each of the sensing units SU may have one of structures shown in FIG. 4A and FIG. 4B. The sensing unit SU1 shown as FIG. 4A includes a variable capacitor Cv connected to a row sensor data line or a column sensor data line (referred as a sensor data line SL hereinafter), and a reference capacitor Cp connected to the sensor data line SL and a reference voltage line RL. The reference capacitor Cp includes the reference voltage line RL and the sensor data line SL that overlaps the reference voltage line RL via an insulator. The variable capacitor Cv includes the sensor data line SL and the common electrode 270 disposed on the common electrode panel 200 as two terminals, and the LC layer 3 disposed between the two terminals SL and 270 functions as a dielectric of the variable capacitor Cv. Capacitance of the variable capacitor Cv is varied depending on an external impulse exerted on the liquid crystal panel assembly 300, such as a user's touch, etc. For example, the external impulse may be pressure caused by a user's touch. When pressure is exerted on one of the TFT array panel 100 and the common electrode panel 200 to change the distance between the terminals of the variable capacitor Cv, the capacitance of the variable capacitor Cv is changed. The change of the capacitance of the variable capacitor Cv in turn changes the voltage Vp of a junction between the reference capacitor Cp and the variable capacitor Cv. The junction voltage Vp is transmitted as a sensor data signal through the sensor data line SL, and it is determined whether a touch occurs based on the sensor data signals.

The sensing unit SU2 shown as FIG. 4B includes a switch SWT connected to a sensor data line SL. The switch SWT includes the sensor data line SL and the common electrode 270 as two terminals. At least one of the two terminals is projected toward the opposing terminal(s) so that the two terminals may contact each other by a user's touch. When the two terminals of the switch SWT are in contact with each other, the common voltage Vcom of the common electrode 270 is transmitted to the sensor data line SL. When the sensing unit SU2 is applied, the reference voltage line RL shown in FIG. 4A may be omitted. The sensor data signals transmitted through the row sensor data lines $SY_1$-$SY_N$ are analyzed to determine a longitudinal position of a touch, and the sensor data signals transmitted through the column sensor data lines $SX_1$-$SX_M$ are analyzed to determine a transverse position of the touch.

Each of the sensing units SU may be disposed between two pixels PX adjacent to each other. Every pair of a row sensor data line $SY_k$ (k=1, 2, ..., N) and a column sensor data line $SX_l$ (l=1, 2, ..., M) defines a pair of sensing units SU that are connected thereto and disposed near the intersection of the pair of the sensor data lines $SY_k$ and $SX_l$. The concentration of such pairs of sensing units SU may equal approximately one quarter of the concentration of dots. When the concentration of the pairs of sensing units SU is about one quarter of the concentration of the dots, for example, the number of the pairs of sensing units SU in a row may be a half of the number of the dots in a row, and the number of the pairs of sensing units SU in a column may be a half of the number of the dots in a column. The LCD having the above-described concentrations of the sensing units SU and the dots may be applied to a precision application such as character recognition. The sensing unit resolution may be changed.

In the meantime, referring to FIG. 5A and FIG. 5B, the liquid crystal panel assembly 300 may further include a plurality of sensing signal lines $S_\alpha$, $P_\beta$, Psg and Psd (where α and β are natural numbers) and a plurality of photosensors PS1 or PS2 connected to the sensing signal lines $S_\alpha$, $P_\beta$, Psg, and Psd and arranged substantially in a matrix. The plurality of sensing signal lines include a plurality of sensor scanning lines $S_\alpha$ for transmitting sensor scanning signals, a plurality of sensor data lines $P_\beta$ for transmitting sensor data signals, a plurality of control voltage lines Psg for transmitting a sensor control voltage, and a plurality of input voltage lines Psd for transmitting a sensor input voltage. The sensor scanning lines $S_\alpha$ and the control voltage lines Psg extend substantially in a row direction and are substantially parallel to each other, while the sensor data lines $P_\beta$ and the input voltage lines Psd extend substantially in a column direction and are substantially parallel to each other.

Each of the photosensors may have one of structures shown in FIG. 5A or FIG. 5B. The photosensor PS1 shown in FIG. 5A includes a sensing element Qp1 and a switching element Qs. The sensing element Qp1 has three terminals, i.e., a control terminal connected to a control voltage line Psg, an input terminal connected to an input voltage line Psd, and an output terminal connected to the switching element Qs. The sensing element Qp1 includes a photoelectric material that generates a photocurrent upon receipt of light. An example of the sensing element Qp1 is a TFT having an amorphous silicon or polysilicon channel that can generate a photocurrent. The sensor control voltage applied to the control terminal of the sensing element Qp1 is sufficiently low or sufficiently high to keep the sensing element Qp1 in an off state in the absence of incident light. The sensor input voltage applied to the input terminal of the sensing element Qp1 is sufficiently high to keep the photocurrent flowing toward a switching element Qs. The switching element Qs also has three terminals, i.e., a control terminal an output terminal, and an input terminal that are connected to a sensor scanning line $S_\alpha$, a sensor data line $P_\beta$, and the sensing element Qp1, respectively. The switching element Qs outputs a sensor output signal to the sensor data line $P_\beta$ in response to the sensor scanning signal from the sensor scanning line $S_\alpha$. The sensor output signal may be the photocurrent from the sensing element Qp1.

The photosensor PS2 shown in FIG. 5B includes a sensing element Qp2 connected to the sensing signal lines $S_\alpha$, $P_\beta$, and Psd, but includes no switching element. The sensing element Qp2 also has three terminals, i.e., a control terminal, an output terminal, and an input terminal that are connected to a sensor scanning line $S_\alpha$, a sensor data line $P_\beta$, and a sensing element Qp1, respectively. The sensing element Qp2 also includes a photoelectric material that generates a photocurrent upon receipt of light, and outputs a sensor output signal to the sensor data line $P_\beta$ in response to the sensor scanning signal from the sensor scanning line $S_\alpha$. The sensing element Qp2 outputs the sensor output signal when the sensor scanning signal is higher than a predetermined voltage, and the predetermined voltage may be determined according to the operating range of the sensing element Qp2. In application of the photosensor PS2, the control voltage line Psg shown in FIG. 5A may be omitted. When the panel assembly 300 includes the photosensors PS1 or PS2 a, the panel assembly 300 excludes either of row sensor data lines $SY_1$-$SY_N$ or the column sensor data lines $SX_1$-$SX_M$ and the sensing units SU connected thereto, which are shown in FIG. 3. Here, the sensor data signals from the sensing units SU are used for determining the occurrence of a touch, and the sensor data signals from the photosensors PS1 or PS2 are used for determining the position of a touch.

Referring to FIG. 1 and FIG. 3 again, the gray voltage generator 550 generates two sets of gray voltages (or reference gray voltages) related to a transmittance of the pixels. The gray voltages in a first set have a positive polarity with respect to the common voltage Vcom, while the gray voltages in a second set have a negative polarity with respect to the common voltage Vcom. The image scanning driver 400 is connected to the image scanning lines $G_1$-$G_n$ of the panel assembly 300, and synthesizes a gate-on voltage Von and a gate-off voltage Voff to generate the image scanning signals for application to the image scanning lines $G_1$-$G_n$. The image data driver 500 is connected to the image data lines $D_1$-$D_m$ of the panel assembly 300 and applies image data signals, which are selected from the gray voltages supplied from the gray voltage generator 550, to the image data lines $D_1$-$D_m$. However, if the gray voltage generator 550 supplies only a limited number of reference gray voltages instead of all gray voltages, the image data driver 500 divides the reference gray voltages to generate the image data signals.

The sensing signal processor 800 is connected to the sensor data lines $SY_1$-$SY_N$ and $SX_1$-$SX_M$ of the panel assembly 300, and receives the sensor data signals from the sensor data lines $SY_1$-$SY_N$ and $SX_1$-$SX_M$. The sensing signal processor 800 processes, for example, amplifies and filters the sensor data signals, and analog-to-digital converts the processed sensor data signals to generate digital sensor data signals DSN. The touch determination unit 700 receives the digital sensor data signal DSN from the sensing signal processor 800 and processes the digital sensor data signals DSN to determine whether and where a touch occurs. The touch determination unit 700 then generates and outputs touch occurrence information TES and touch position information PXY to an external device. The touch determination unit 700 includes a frame memory (not shown) for storing the digital sensor data signals DSN. The signal controller 600 controls the image scanning driver 400, the image data driver 500, the gray voltage generator 550, and the sensing signal processor 800, etc.

Each of the processing units 400, 500, 550, 600, 700, and 800 may include at least one integrated circuit (IC) chip mounted on the LC panel assembly 300, on a flexible printed circuit (FPC) film in a tape carrier package (TCP) type or on a separate printed circuit board PCB, which are attached to the panel assembly 300. Alternatively, at least one of the processing units 400, 500, 550, 600, 700, and 800 may be integrated into the panel assembly 300 along with the signal lines $G_1$-$G_n$, $D_1$-$D_m$, $SY_1$-$SY_N$, and $SX_1$-$SX_M$, the TFT Q, etc. Alternatively, all the processing units 400, 500, 550, 600, 700, and 800 may be integrated into a single IC chip, but at least one of the processing units 400, 500, 550, 600, 700, and 800 or at least one circuit element in the processing units 400, 500, 550, 600, 700, and 800 may be disposed out of the single IC chip.

When the LCD includes the photosensors PS1 or PS2 shown in FIG. 5A or FIG. 5B, the LCD further includes a sensor scanning driver (not shown) connected to the sensor scanning lines $S_\alpha$ and applying the sensor scanning signals to the sensor scanning lines $S_\alpha$. The sensor data lines $P_\beta$ are connected to the sensing signal processor 800. When the photosensors PS1 are employed, the sensor scanning signals have voltage levels equal to the gate-on voltage Von and the gate-off voltage Voff. However, when the photosensors PS2 are employed, the sensor scanning signals include a high level voltage for making the photosensors PS2 to output their sensor output signals and a low level voltage for preventing the photosensors PS2 from outputting their sensor output signals, the magnitudes of the high level voltage and the low level voltage are determined in consideration of the operating range of the sensing element Qp2.

Now, the display operation and the sensing operation of the above-described LCD will be described in detail. The signal controller 600 is supplied with input image signals R, G, and B and input control signals for controlling the display thereof from an external device (not shown). The input image signals R, G, and B include luminance information of each pixel PX, and have a predetermined number of grays, for example, 1024 ($=2^{10}$), 256 ($=2^8$), or 64 ($=2^6$) grays. The input control signals include, for example, a vertical synchronization signal Vsync, a row synchronization signal Hsync, a main clock signal MCLK, and a data enable signal DE.

On the basis of input image signal R, G, and B and the input control signals, the signal controller 600 processes the image signals R, G, and B to be suitable for the operation of the display panel 300 and the image data driver 500, and generates image scanning control signals CONT1, image data control signals CONT2, sensor data control signals CONT3, etc. The signal controller 600 then sends the scanning control signals CONT1 to the image scanning driver 400, the image data control signal CONT2 and the processed image signals DAT to the image data driver 500, and the sensor data control signal CONT3 to the sensing signal processor 800. The image scanning control signals CONT1 include an image scanning start signal STV for instructing to start image scanning and at least one clock signal for controlling the output time of the gate-on voltage Von. The image scanning control signals CONT1 may further include an output enable signal OE for defining the duration of the gate-on voltage Von.

The image data control signals CONT2 include a horizontal synchronization start signal STH for informing of start of the transmission of the image signals DAT for a row of pixels PX, a load signal LOAD for instructing to apply the image data signals to the image data lines $D_1$-$D_m$, and a data clock signal HCLK. The image data control signal CONT2 may further include an inversion signal RVS for reversing the polarity of the voltages of the image data signals relative to the common voltage Vcom (simply referred to as "the polarity of the image data signals" hereinafter). Responsive to the image data control signals CONT2 from the signal controller 600, the image data driver 500 receives a packet of the digital image signals DAT for the row of pixels PX, converts the digital image signals DAT into analog image data signals selected from the gray voltages, and applies the analog image data signals to the image data lines $D_1$-$D_m$.

The image scanning driver 400 applies the gate-on voltage Von to the image scanning lines $G_1$-$G_n$ in response to the image scanning control signals CONT1 from the signal controller 600, thereby turning on the switching transistors Q connected thereto. The image data signals applied to the image data lines $D_1D_m$ are then supplied to the pixels PX through the activated switching transistors Q. The difference between the voltage of an image data signal and the common voltage Vcom applied to a pixel PX is represented as a voltage across the LC capacitor Clc of the pixel PX, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts light polarization into light transmittance to display images. By repeating this procedure by a unit of a horizontal period (also referred to as "1H" and that is equal to one period of the row synchronization signal Hsync and the data enable signal DE), all image scanning lines $G_1$-$G_n$ are sequentially supplied with the gate-on voltage Von, thereby applying the image data signals to all pixels PX to display an image for a frame. When the next frame starts after one frame finishes, the inversion control signal RVS applied to the data driver 500 is controlled such that the polarity of the image data signals is reversed (which is referred to as "frame inversion"). The inversion control signal RVS may also be controlled such that the polarity of the image data signals flowing in a data line is periodically reversed during one frame (for example, row inversion and dot inversion), or the polarity of the image data signals in one packet is reversed (for example, column inversion and dot inversion).

The sensing signal processor 800 reads the sensor data signals flowing in the sensor data line $SY_1$-$SY_N$ and $SX_1$-$SX_M$ once a frame during porch periods between adjacent frames in response to the sensing control signals CONT3. Each of the sensor data signals is carried by a sensor data line for each frame and formed by the sensor output signals generated by the sensing units SU connected to the sensor data line. In the porch periods, the sensor data signals are little influenced by the other signals supplied from the image scanning driver 400, the image data driver 500, etc. to the panel assembly 300, and accordingly the sensor data signal may have high reliability. The sensor data signal may be read once for a plurality of frames. The sensing signal processor 800 processes, for example amplifies and filters, the read sensor data signals, and converts the analog sensor data signals into digital sensor data signals DSN to be sent to the touch determination unit 700. The touch determination unit 700 appropriately processes the digital sensor data signals DSN to determine whether and where a touch occurs, and sends touch occurrence information TES and touch position information PXY to an external device. The external device sends image signals R, G, and B that are generated based on the touch information TES and PXY to the LCD.

In application of the photosensors PS1, the sensor scanning driver supplies the gate-on voltage Von to a sensor scanning line $S_\alpha$ to turn on the switching element Qs connected thereto. The sensor output signals from the sensing elements Qp1 are transmitted to the respective sensor data lines $P_\beta$ through the activated switching elements Qs to form sensor data signals. However, for the photosensors PS2, the sensor scanning driver may supply a high level voltage to the sensor scanning line $S_\alpha$ to make the sensing elements Qp2 connected to the sensor scanning line $S_\alpha$ load their output sensor output signals as the sensor data signals on the respective sensor data line $P_\beta$. Here, the sensing signal processor 800 reads the sensor data signals flowing in the sensor data line $P_\beta$, processes, for example amplifies and filters, the read sensor data signals, and converts the analog sensor data signals into digital sensing signals DSN to be sent to the touch determination unit 700. By repeating this procedure by a unit of a predetermined number of horizontal periods determined by the number of rows of the photosensors PS1 or PS2, the gate-on voltage (Von)/high level voltage is sequentially applied to all the sensor scanning lines $S_\alpha$, such that the sensor output signals from all the photosensors PS1 or PS2 are processed to generate the digital sensor data signals.

Figure 6:
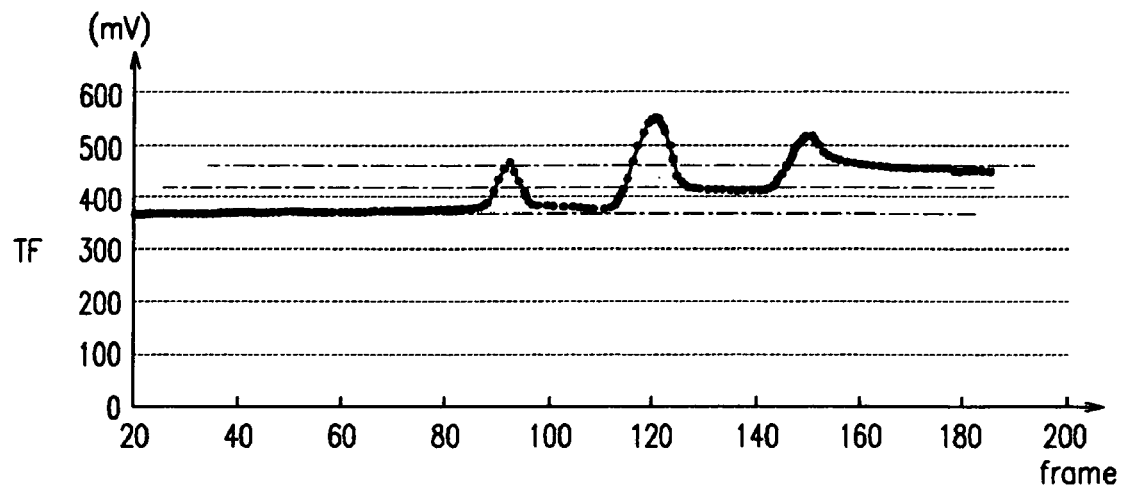
FIG. 6 is a waveform diagram showing digital filtered data of an LCD according to an embodiment of the present invention.
Figure 7:
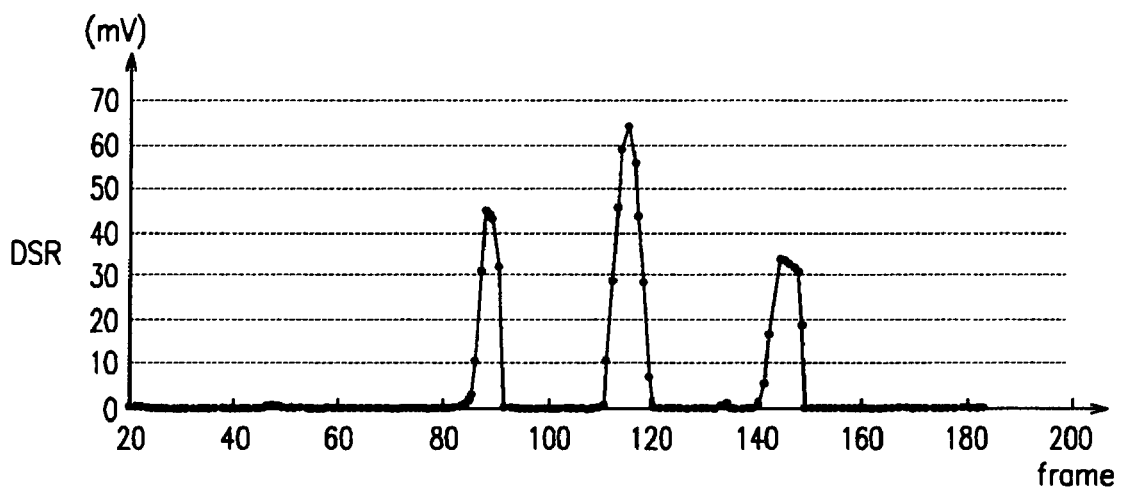
FIG. 7 and FIG. 8 are waveform diagrams showing first and second differential data, respectively, according to an embodiment of the present invention.
Figure 8:
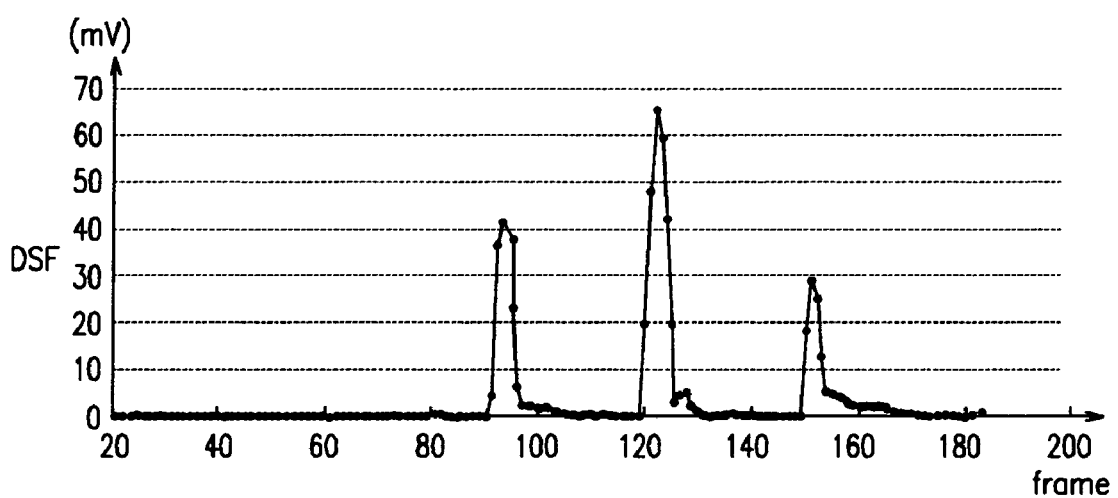

Now, a method of determining the occurrence and the position of a touch from the digital sensor data signals DSN by the touch determination unit 700 will be described in detail. Firstly, the processing of the digital sensor data signals DSN by the touch determination unit 700 according to an embodiment of the present invention is described in detail with reference to FIG. 6 to FIG. 8. FIG. 6 is a waveform diagram showing digital filtered data of an LCD according to an embodiment of the present invention, and FIG. 7 and FIG. 8 are waveform diagrams showing first and second differential data, respectively, according to an embodiment of the present invention.

The touch determination unit 700 stores the digital sensor data signals DSN inputted from the sensing signal processor 800 in a frame memory. Here, the frame memory stores the digital sensor data signals DSN for a plurality of frames. The touch determination unit 700 reads the digital sensor data signals DSN for a row or a column for the plurality of frames and performs digital filtering on the read digital sensor data signals DSN. The digital filtering may be represented as a smoothing filter having Equation 1.

$$TF(q) = \frac{1}{K} \sum_{p=q-K+1}^{q} DSN(p) \quad \text{(Equation 1)}$$

where DSN(p) is a digital sensor data signal for the p-th frame, K is a natural number denoting the number of frames to be summed, and TF(q) is a filtered digital sensor data signal (referred to as digital filtered data hereinafter) of for the q-th frame. Referring to Equation 1, the digital sensor data signal DSN(j) for the q-th frame and the digital sensor data signals for previous (K−1) frames are added to yield a sum, and then the sum of the digital sensor data signals for K frames is divided by K to get the digital filtered data TF(q) of the q-th frame. Although the analog sensor data signals are analog-filtered in the sensing signal processor 800, the digital sensor data signal DSN may still include a noise. The above-described digital filtering for the digital sensor data signals DSN may remove the noise included in the digital sensing signal DSN, thereby further increasing the purity of the digital sensor data signals DSN.

For one example, an analog representation of a digital filtered data TF is shown as function of frame in FIG. 6. Referring to FIG. 6, the digital filtered data TF has peaks around the frames where a touch occurs and is substantially piecewise constant between the peaks. It is noted that the constant levels of the digital filtered data TF before and after the peaks are different. For example, the level of the digital filtered data TF before and after the first peak is changed from about 380 mV to about 410 mV, the voltage level before and after the second peak is changed from about 410 mV to about 460 mV, and so on. The change in the level of the digital filtered data TF may be caused by the noise introduced into the sensing units SU, and the sensor data lines $SY_1$-$SY_N$ and $SX_1$-$SX_M$, etc., and by the change of the sensing conditions. Accordingly, determining the occurrence of a touch based only on the magnitude of the digital filtered data TF may make an error. For example, if the level of the digital filtered data TF in the absence of a touch is wrongly determined to be equal to about 380 mV based only on the initial voltage of the digital filtered data TF and if it is determined that there is a touch when the level of the digital filtered data TF is greater than 410 mV, then it misleads wrong determination that a touch occurs in the absence of a touch because the level of the digital filtered data TF reaches 410 mV or more in the absence of a touch as shown in FIG. 6.

According to an embodiment of the present invention, a first difference data DSR defined as Equation 2 is used to determine whether a touch occurs.

$$DSR(q) = \text{Max}\{0, \{TF(q) - TF(q-p)\}_{p=1, 2, \ldots, L}\} \quad \text{(Equation 2)}$$

Here, DSR(q) denotes the first difference data for the q-th frame, and L denotes the number of previous frames to be calculated for obtaining the first difference data. Referring now to the Equation 2, the first difference data DSR(q) for the q-th frame is equal to the maximum of 0, TF(q)−TF(q−1), TF(q)−TF(q−2), . . . , and TF(q)−TF(q−L). That is to say, the difference data DSR(q) for the q-th frame is equal to the maximum of zero and the subtractions of the digital filtered data TF(q−1), TF(q−2), . . . , and TF(q−L) for the previous frames from the digital filtered data TF(q) for the q-th frame, and the first difference data of the current frame DSR(q) is 0 or more.

An analog simulation of the first difference data DSR for the digital filtered data TF shown in FIG. 6 for L=6 is shown in FIG. 7. Referring now to FIG. 7, the first difference data DSR has peaks during the rising of the digital filtered data TF, and is substantially equal to zero in other times including during the falling of the digital filtered data TF. Therefore, the rising of the digital filtered data TF can be detected using the first difference data DSR. Accordingly, the starting point of a touch can be also detected, and it is correctly determined that there is no touch even when the constant level of the digital filtered data TF is high.

A second difference data DSF defined as Equation 3 is also used to determine whether a touch occurs.

$$DSF(q) = \text{Max}\{0, \{TF(q-L) - TF(q-L+p)\}_{p=1, 2, \ldots, L}\}. \quad \text{(Equation 3)}$$

Here, DSF(q) denotes the second difference data for the q-th frame. Referring now to Equation 3, the second difference data DSF(q) for the q-th frame is equal to the maximum of 0, TF(q−L)−TF(q−L+1), TF(q−L)−TF(q−L+2), . . . , and TF(q−L)−TF(q). The second difference data DSF(q) for the q-th frame is equal to the maximum of zero and the subtractions of the digital filtered data TF(q−L+1), TF(q−L+2), . . . , and TF(q) from the digital filtered data TF(q−L) for the (q−L)th frame. An analog simulation of the second difference data DSF for the digital filtered data TF shown in FIG. 6 for L=6 is shown in FIG. 8.

Referring to FIG. 8, the second difference data DSF has peaks during the falling of the digital filtered data TF, and is substantially equal to zero in other times including during the rising of the digital filtered data TF. Therefore, the falling of the digital filtered data TF can be detected using the second difference data DSF. Accordingly, the ending point of a touch can be also detected, and it is correctly determined even when the constant level of the digital filtered data TF is high. Now, the determination of a touch by the touch determination unit 700 based on the first and the second difference data DSR and DSF is described with reference to FIG. 9 and FIG. 10.

Figure 9:
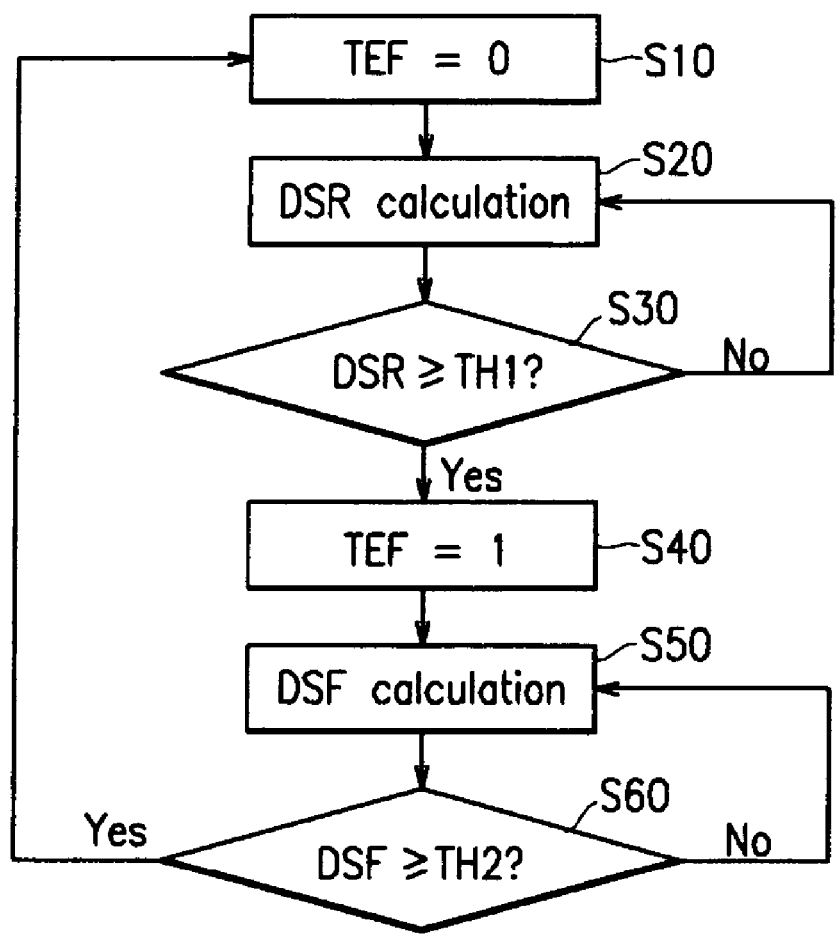
FIG. 9 is a flowchart for determining a touch exerted on an LCD according to an embodiment of the present invention.
Figure 10:
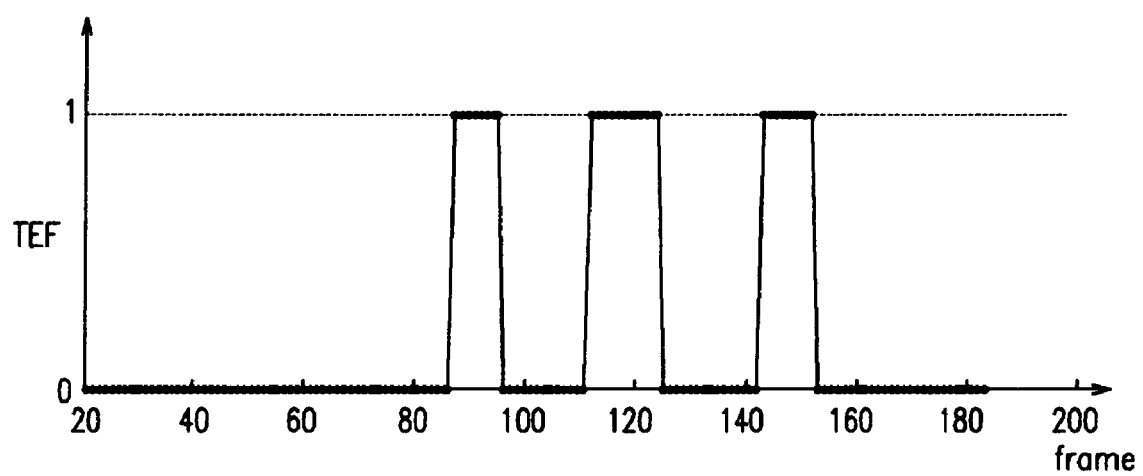
FIG. 10 is a waveform diagram showing a touch event flag of an LCD according to an embodiment of the present invention.

FIG. 9 is a flowchart for determining a touch exerted on an LCD according to an embodiment of the present invention, and FIG. 10 is a waveform diagram showing a touch event flag of an LCD according to an embodiment of the present invention. Referring now to FIG. 9, the touch determination unit 700 changes a touch event flag TEF based on first and second difference data DSR and DSF. The touch event flag TEF equal to "0" represents no occurrence of a touch, and the touch event flag TEF equal to "1" represents an occurrence of a touch. First, the touch determination unit 700 initializes the touch event flag TEF to "0" (S10). The first difference data DSR is calculated (S20) and compared with a predetermined value TH1 (S30). If the first difference data DSR is smaller than the predetermined value TH1, the touch event flag TEF is maintained in "0" and the procedure returns to step S20 for the next frame. If the first difference data DSR is equal to or greater than the predetermined value TH1, the touch event flag TEF is changed into "1" (S40). The second difference data DSF is calculated (S50) and compared with a predetermined value TH2 (S60). If the second difference data DSF is smaller than the predetermined value TH2, the touch event flag TEF is maintained in "1" and the procedure returns to step S50 for the next frame. If the second difference data DSF is equal to or larger than the predetermined value TH2, the touch event flag TEF is changed into "0" (S10) and the procedure returns to step S20. An example of the touch event flag TEF for the first and second difference data DSR and DSF as shown in FIG. 7 and FIG. 8 is shown in FIG. 10. Here, the predetermined values TH1 and TH2 were equal to 20 mV.

Referring to FIG. 10, the touch event flag TEF maintains "1" from beginning to end of a touch, while the touch event flag TEF maintains "0" during other times. As described above, the starting time and the finishing time of a touch can be detected using the first and second difference data DSR and DSF, and accordingly a long touch such as dragging, drawing, etc., as well as a momentary touch can be also detected. The touch event flag TEF is calculated for the digital sensor data signal DSN for each column and for each row, and the calculated touch event flags TEF are used for determining the position of a touch. If a touch occurs, the touch event flag TEF for at least one row and at least one column becomes "1," and then the position of the touch is determined by searching which row and column have the touch event flag TEF of "1." Meanwhile, the digital filtered data TF may have negative peaks when a touch occurs unlike that shown FIG. 6. Then, the first difference data DSR and the second difference data DSF may be defined as minima of zero and the subtractions instead of maxima. In addition, the conditions for changing the value of the touch event flag TES in steps S30 and S60 shown in FIG. 9 may be changed into DSR≦TH1 and DSF≦TH2 (where TH1 and TH2 is a negative number). In the meantime, when employing the photosensors PS1 or PS2, each digital sensor data signal DSN is obtained by the sensor output signals for the photosensors PS1 and PS2 disposed at predetermined locations, and then an edge detection algorithm etc., may be applied to the digital sensor data signals DSN to determine the position of a touch.

The above-described embodiments can be also applied to other flat panel displays such as plasma display panels, organic light emitting diode (OLED) displays, field emission displays, etc. Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A display device, comprising:
   a display panel;
   a plurality of pixels disposed on the display panel;
   a plurality of first sensing units disposed on the display panel and generating first sensing signals in response to a touch exerted on the display panel; and
   a sensing signal processor configured to process the first sensing signals and generate second sensing signals for a plurality of frames, the sensing signal processor determining whether a touch occurs based on the second sensing signals for the plurality of frames, and the sensing signal processor determines whether a touch begins based on differences in the second sensing signals between a first frame and at least one second frame previous to the first frame, and determines whether a touch ends in the first frame based on differences in the second sensing signals between the first frame and a third frame previous to the first frame and between the third frame and one or more fourth frames that occur between the third frame and the first frame.

2. The display device of claim 1, wherein the sensing signal processor determines whether a touch occurs based on differences in the second sensing signals between the plurality of frames.

3. The display device of claim 2, wherein the sensing signal processor determines whether a touch occurs in the first frame based on differences in the second sensing signals between the first frame and at least one second frame previous to the first frame.

4. The display device of claim 2, wherein the sensing signal processor determines whether a touch occurs in the first frame based on differences in the second sensing signals between the first frame and the second frame previous to the first frame and between the second frame and the third frames that occur between the second frame and the first frame.

5. The display device of claim 1, wherein the sensing signal processor calculates a first difference data for the first frame that is defined as a maximum of subtractions of the second sensing signals for the second frame previous to the first frame from the second sensing signal for the first frame, and determines that a touch begins when the first difference data is equal to or greater than a first positive value.

6. The display device of claim 5, wherein the sensing signal processor calculates a second difference data for the first frame that is defined as a maximum of subtractions of the second sensing signals for the first frame and for third frame previous to the first frame from the second sensing signal for the fourth frames that occur between the third frame and the first frame, and determines that a touch ends when the second difference data is equal to or greater than a second positive value.

7. The display device of claim 1, wherein the sensing signal processor calculates a first difference data for the first frame that is defined as a minimum of subtractions of the second sensing signals for the second frame previous to the first frame from the second sensing signal for the first frame, and determines that a touch begins when the first difference data is equal to or smaller than a first negative value.

8. The display device of claim 7, wherein the sensing signal processor calculates a second difference data for the first frame that is defined as a minimum of subtractions of the second sensing signals for the first frame and for a third frame previous to the first frame from the second sensing signal for the fourth frames that occur between the third frame and the first frame, and determines that the touch ends when the second difference data is equal to or smaller than a second negative value.

9. The display device of claim 1, further comprising a frame memory configured for storing and providing the second sensing signals.

10. The display device of claim 1, wherein the sensing signal processor is configured to amplify the first sensing signals to provide amplified first sensing signals, the sensing signal process being configured to digitize the amplified first sensing signals.

11. The display device of claim 10, wherein the sensing signal processor averages the digitized first sensing signals over the plurality of frames to generate the second sensing signals.

12. The display device of claim 1, wherein the plurality first sensing units comprise a plurality of rows of second sensing units and a plurality of columns of third sensing units, wherein the second sensing units in each row are connected to each other, and the third sensing units in each column are connected to each other.

13. The display device of claim 12, further comprising:
a plurality of first sensor data lines connected to the second sensing units, the plurality of first sensor data lines extending in a row direction and being configured to transmit the first sensing signals from the second sensing units; and
a plurality of second sensor data lines connected to the third sensing units, the plurality of second sensor data lines extending in a column direction and being configured to transmit the first sensing signals from the third sensing units.

14. The display device of claim 13, wherein the sensing signal processor determines an occurrence of a touch based on each of the first sensing signals and determines a position of a touch depending on the determination of an occurrence of a touch.

15. The display device of claim 1, wherein the plurality of first sensing units are configured to sense pressure exerted on the display panel.

16. The display device of claim 15, further comprising a plurality of second sensing units configured to sense ambient light and to generate third sensing signals, wherein the sensing signal processor determines a position of a touch based on the third sensing signals.

17. The display device of claim 16, wherein the sensing signal processor converts the third sensing signals to fourth sensing signals, the sensing signal processor being configured to apply an edge detection algorithm to the fourth sensing signals to determine where the touch occurs.

18. An apparatus for driving a display panel including a plurality of sensing units configured to generate a plurality of first sensing signals in response to a touch exerted on the display panel, the apparatus comprising:
a sensing signal processor configured to generate a plurality of second sensing signals for a plurality of frames based on the first sensing signals from the display panel and determining whether a touch occurs based on the second sensing signals for the plurality of frames; and
a frame memory configured to store at least one of the first and second sensing signals wherein the sensing signal processor is configured to determine that a touch begins in a current frame when a first difference data for the current frame is equal to or greater than a first positive value, and the first difference data for the current frame is defined as a maximum of subtractions of the second sensing signals for a first predetermined number of previous frames from the second sensing signal for the current frame, and
wherein the sensing signal processor is configured to determine that a touch ends in the current frame when a second difference data for the current frame is equal to or greater than a second positive value, and the second difference data for the current frame is defined as a maximum of subtractions of the second sensing signals for the current frame and for a second predetermined number of previous frames from the second sensing signal for another frame before the second predetermined number of previous frames.

19. The apparatus of claim 18, wherein the sensing signal processor is configured to amplify the first sensing signals to provide amplified first sensing signals, the sensing signal processor being configured to digitize the amplified first sensing signals.

20. The driving apparatus of claim 19, wherein the sensing signal processor averages the digitized first sensing signals over the plurality of frames to generate the second sensing signals.

21. A method of detecting a touch exerted on a display panel, the method comprising:
generating a plurality of pointwise sensor output signals in response to a touch exerted on the display panel;
collecting the sensor output signals in rows and columns to generate a sensor data signal for each row and for each column corresponding to each frame of a plurality of frames; and
determining whether a touch occurs based on the sensor data signals for the plurality of frames; and
wherein the operation of determining whether a touch occurs comprises: calculating a first difference data for a current frame equal to a maximum of subtractions of the sensor data signals for a first predetermined number of frames previous to the current frame from the sensor data signal for the current frame; and comparing the first difference data with a first predetermined value, wherein it is determined that a touch begins when the first difference data is equal to or greater than the first predetermined value; and
wherein the operation of determining whether a touch occurs further comprises: calculating a second difference data for a current frame equal to a maximum of subtractions of the sensor data signals for the current frame and for a second predetermined number of frames previous to the current frame from the second sensing signal for another frame previous to the second predetermined number of previous frames; and comparing the second difference data with a second predetermined value, wherein it is determined that a touch ends when the second difference data is equal to or greater than the second predetermined value.

22. The method of claim 21, further comprising: amplifying the sensor data signals; digitizing the amplified sensor data signals; and averaging the digitized sensor data signals over a predetermined number of frames.

* * * * *